US011318967B2

(12) United States Patent
Ding et al.

(10) Patent No.: US 11,318,967 B2
(45) Date of Patent: May 3, 2022

(54) CRASH SYSTEM FOR A RAIL VEHICLE

(71) Applicants: CRRC QINGDAO SIFANG CO., LTD., Shandong (CN); CG RAIL—CHINESISCH-DEUTSCHES FORSCHUNGS—UND ENTWICKLUNGSZENTRUM FüR BAHN—UND VERKEHRSTECHNIK DRESDEN GMBH, Dresden (DE)

(72) Inventors: Sansan Ding, Shandong (CN); Honglei Tian, Shandong (CN); Peng Lin, Shandong (CN); Junshuang Cai, Shandong (CN); Qing Xu, Shandong (CN); Letian Teng, Shandong (CN); Dawei Ruan, Shandong (CN); Chongcheng Zhong, Shandong (CN); Werner Hufenbach, Dresden (DE); Andreas Ulbricht, Dresden (DE)

(73) Assignees: CRRC QINGDAO SIFANG CO., LTD., Shandong (CN); CG RAIL—CHINESISCH-DEUTSCHES FORSCHUNGS—UND ENTWICKLUNGSZENTRUM FÜR BAHN—UND VERKEHRSTECHNIK DRESDEN GMBH, Dresden (DE)

( * ) Notice: Subject to any disclaimer, the term of this patent is extended or adjusted under 35 U.S.C. 154(b) by 408 days.

(21) Appl. No.: 16/484,086

(22) PCT Filed: Feb. 6, 2018

(86) PCT No.: PCT/EP2018/052919
§ 371 (c)(1),
(2) Date: Aug. 6, 2019

(87) PCT Pub. No.: WO2018/146082
PCT Pub. Date: Aug. 16, 2018

(65) Prior Publication Data

US 2020/0001903 A1 Jan. 2, 2020

(30) Foreign Application Priority Data

Feb. 9, 2017 (DE) .................... 10 2017 102 568.5

(51) Int. Cl.
*B61D 15/06* (2006.01)
*B61D 17/06* (2006.01)
(Continued)

(52) U.S. Cl.
CPC ............. *B61D 15/06* (2013.01); *B61D 17/06* (2013.01); *B61F 19/04* (2013.01); *B61G 7/10* (2013.01); *B61G 9/04* (2013.01); *B61G 11/16* (2013.01)

(58) Field of Classification Search
CPC ......... B61D 15/06; B61D 17/06; B61F 19/04; B61G 7/10; B61G 9/04; B61G 11/16
See application file for complete search history.

(56) References Cited

U.S. PATENT DOCUMENTS

| 6,431,083 B1 | 8/2002 | Carstensen et al. |
| 2007/0186802 A1 | 8/2007 | Gough |

(Continued)

FOREIGN PATENT DOCUMENTS

| CN | 103625501 A | 3/2014 |
| CN | 103832446 A | 6/2014 |

(Continued)

OTHER PUBLICATIONS

International Search Report for PCT/EP2018/052919 dated May 4, 2018, ISA/CN.

(Continued)

*Primary Examiner* — Robert J McGarry, Jr.
(74) *Attorney, Agent, or Firm* — Yue (Robert) Xu; Apex Attorneys at Law, LLP

(57) ABSTRACT

The application relates to a crash system for the head module of a rail vehicle, said head module being detachably fixed to the front face of a subsequent railcar unit without additional underframe. The crash system has a crash conduction element that carries a crash box at its front end and the back end of which is fixed to the underframe support of the subsequent railcar unit. In the event of a crash, crash forces are thus absorbed by the underframe of the subsequent railcar unit.

18 Claims, 6 Drawing Sheets

(51) Int. Cl.
*B61F 19/04* (2006.01)
*B61G 7/10* (2006.01)
*B61G 9/04* (2006.01)
*B61G 11/16* (2006.01)

(56) References Cited

U.S. PATENT DOCUMENTS

| | | |
|---|---|---|
| 2010/0064931 A1 | 3/2010 | Heinisch et al. |
| 2010/0218701 A1 | 9/2010 | Graf et al. |
| 2015/0033978 A1 | 2/2015 | Oohashi et al. |

FOREIGN PATENT DOCUMENTS

| | | | |
|---|---|---|---|
| CN | 105015570 A | 11/2015 | |
| CN | 106240587 A | 12/2016 | |
| CN | 106347387 A | 1/2017 | |
| DE | 19649526 A1 | 6/1998 | |
| DE | 19725905 A1 | 12/1998 | |
| DE | 69818357 T2 | 6/2004 | |
| DE | 602004009942 T2 | 10/2008 | |
| DE | 602005004131 T2 | 12/2008 | |
| DE | 102014214405 A1 | 1/2015 | |
| DE | 102014204761 A1 | 9/2015 | |
| FR | 2698840 A1 | 6/1994 | |
| GB | 2411630 A | 7/2005 | |
| JP | 2014088177 A * | 5/2014 | ............. B61D 17/06 |
| JP | 2014088177 A | 5/2014 | |
| WO | 2009040309 A1 | 4/2009 | |
| WO | 2010029188 A1 | 3/2010 | |
| WO | 2015011193 A1 | 1/2015 | |

OTHER PUBLICATIONS

The Chinese 1st Office Action dated Jun. 3, 2020 for Chinese Application No. CN201880009620.8.
The Japanese 1st Office Action dated Aug. 31, 2020 for Japanese Application No. JP2019-543250.

* cited by examiner

CRASH SYSTEM FOR A RAIL VEHICLE

CROSS-REFERENCE TO RELATED APPLICATIONS

This application is the national phase of International Application No. PCT/EP2018/052919, titled "CRASH SYSTEM FOR A RAIL VEHICLE", filed on Feb. 6, 2018, which claims the priority of German patent application No. 102017102568.5 filed on Feb. 9, 2017, the entire disclosures of the applications are incorporated herein by reference.

The present invention relates to a construction for conducting impact energy in the event of a crash for a head module of rail vehicles. The crash system according to the invention is suitable for dissipating the loads that occur and passing them on to the following coach section behind the head module in the event of a crash.

In particular it is a head module for commuter trains, in particular underground trains. In such trains, the head module is often integrated into the coach. The head module is also referred to as cab in the following.

In the interests of material and energy efficiency, in recent years the use of light materials and of the principles of lightweight construction has become increasingly established in rail vehicle construction.

In particular the use of fibre composite materials is constantly increasing. This also applies to the design of the head modules of rail vehicles.

Known constructions here provide for attaching prefabricated modules to the substructure, which runs through the entire coach without interruption.

Thus DE 197 25 905 relates to a method for connecting a prefabricated head module made of fibre-reinforced plastic (FRP) to the underframe and the coach body module. The side walls of the head module are preferably manufactured as a sandwich structure made of FRP with a core material in between. Here, special reinforcing profiles are used in the joining areas of the head module, which improve the force transmission between underframe or coach module and the FRP walls of the head module. A special design of the fibre direction of the FRP reinforcement is not provided. The reinforcing profiles are integrated into the core of the FRP walls of the head module and act as support for the bolt connection between FRP walls of the head module and underframe or coach body module. A disadvantage here is that the reinforcing fibre materials between the reinforcing profile and the underframe are subjected to a compressive load and there is thus the risk of damage, due to creep, to the FRP material in this area.

DE 10 2014 204 761 A1 deals with the problem of crash safety, in particular of the front panel, in the case of the rail vehicle header modules. It is provided that the frame of the front panel has a deformation element which can absorb energy and dissipate it through its deformation. The front panel is as far as possible to move out of the frame without the formation of fragments. This is realized in DE 10 2014 204 761 A1 in that predetermined breaking points are provided in the frame of the front panel or in proximity thereto. The predetermined breaking points are produced through the geometric design, the dimensioning of the deformation element or the material thereof. In one embodiment, the deformation element is to run partly or completely around the front panel. The frame can also be formed by the vehicle shell itself.

WO 2015/011193 A1 relates to an energy absorption device for rail vehicles. The purpose of this device is to absorb a portion of the impact energy and to convert it into material deformation in the event of a crash. For this a three-dimensionally formed body made of FRP is used. This has layers with unidirectionally oriented fibres and layers with fibres arranged omnidirectionally (randomly oriented fibres). The energy absorption is realized in particular in that a counter-element strikes the energy absorption element in the longitudinal direction and destroys, in particular by fibrous disintegration, the ply or plies with randomly oriented fibres. The arrangement of the fibres without a preferred direction guarantees that the impact energy is converted when the fibres are broken down and does not lead to a delamination of different fibre layers.

WO 2010/029188 A1 discloses a self-supporting vehicle front-end which is preferentially composed of fibre composite material. The vehicle front-end has structural elements which serve to absorb energy in the event of a crash as well as other structural elements which do not have a specific function for energy dissipation. In particular, the energy-absorbing structural elements are also to consist of fibre composite material. It is furthermore provided that a series of energy-dissipating structural elements successively contributes to the energy absorption or transmits corresponding forces. The vehicle front-end has a central buffer coupling which due to its design lies in front of the external cladding of the vehicle front-end. An energy absorption element that is to absorb impacts exerted on the coupling is therefore arranged directly behind the central buffer coupling. The central buffer coupling itself is arranged on a frame-like structure which distributes the tensile and compressive forces of normal operation over the entire width of the coach section arranged behind. In addition to the energy absorption element, two further lateral energy absorption elements are arranged parallel thereto, which are to act as anti-overriding protection. Furthermore, the railing underneath the front window has at least one, preferably two, energy absorption elements. On each side of the front-end section, two lines for energy transmission lead from the railing into the substructure of the coach section. In addition, two energy absorption elements are arranged in front of the two A pillars in the direction of movement. The A pillars are designed to conduct kinetic energy into the roof structure and to dissipate in a controlled manner any impact energy still remaining in the event of a crash. This is necessary as conventional coach section constructions do not have any longitudinal beams arranged in the roof area, which could absorb portions of the impact energy. A disadvantage here is that a force exerted on the railing in conjunction with the two lateral lines for energy transmission can lead to a lever action on the roof construction, which sets the latter in motion, substantially perpendicular to the direction of movement of the vehicle. This can at least reduce the ability of the roof construction to absorb remaining impact energy. There is thus a disadvantageous coupling of safety systems.

DE 60 2004 009 942 T2 deals with an impact energy absorption system for a light rail vehicle. The crash system described comprises five different zones which are formed for different collision scenarios. The first three zones are to absorb load peaks, the last two are to prevent the penetration into or the compression of the passenger area.

DE 60 2005 004 131 T1 describes a frame for a vehicle front-end in which several yieldable regions are distributed. The frame is designed such that as extensive an energy absorption as possible takes place in the yieldable regions.

The named solutions are suitable for trains which can be exposed to a plurality of different collision opponents. The solutions applied are accordingly complex. In the area of the central buffer coupling, the object is to propose a solution which has a simple structural design and is suitable both for reliably transmitting the tensile and compressive forces of normal operation to the following coach section, and for dissipating the impact forces as far as possible in the event of a crash and diverting any remaining energy into the following coach section.

By normal operation is meant the forces arising in everyday normal operation, in particular the loads arising from acceleration of the train, braking, shunting and during the coupling procedures. The accidental collision with a similar head module of another train is referred to as the event of a crash.

The object is to be achieved for a vehicle head which does not have at its disposal a continuous substructure which reaches from the coach section into the vehicle head. In order to be able to achieve the object, the design features of the coach section are to be taken into consideration.

In the present case, the sub-object is to be able to install the vehicle head according to the invention on a coach section which is characterized by corresponding interface components. These are in particular:

two longitudinal beams of the underframe, which extend in the longitudinal direction on the lower edges of the coach section and the end faces of which are suitable for the installation of the vehicle head, an underframe support for the driver's cab, which runs between the two longitudinal beams of the underframe and opens into the main cross beam which is mounted in the bogie of the coach section. The main cross beam is supported in the two longitudinal beams of the underframe. The underframe support for the driver's cab and the main cross beam are preferably manufactured from steel.

two longitudinal beams of the coach roof, which extend in the longitudinal direction on the upper edges of the coach section and the end faces of which are suitable for the installation of the vehicle head.

The longitudinal beams are preferably manufactured from fibre composite material. All interface components have corresponding fixing options for the corresponding components of the cab. These are preferably detachable fixings, quite particularly preferably screw connections.

The object is achieved according to the invention with a crash system according to claim 1. Advantageous embodiments are disclosed in the subordinate dependent claims.

The crash system according to the invention is designed as a lower crash conduction element which is fitted with a crash box and in addition conducts the remaining impact energy into the underframe support of the following coach section. The crash conduction element thus runs underneath the cab base. According to the invention the central buffer coupling is fixed to the crash conduction element.

The force transmission via the central buffer coupling during normal operation is thus advantageously combined with the transmission of the remaining impact energy in the event of a crash. Two separate or partially separate systems are thereby advantageously avoided. This advantageously simplifies the design and facilitates the installation of the head section on the following coach section. The central buffer coupling has a telescopic construction. It can be moved from a rest position, in which it is housed behind a flap in the front side of the head section, into a working position, in which the coupling of further train sections is possible. The central buffer coupling in addition has an energy absorption element according to the state of the art. This energy absorption element converts a portion of the impact energy into deformation work in the event of a crash, if the collision takes place while the central buffer coupling is in the working position.

The driver's cab is preferably formed as a two-shell construction. The outer shell is connected to the systems which convert the impact energy into deformation in the event of a crash. The inner shell lines the actual interior space which can be used by passengers. Both shells are formed as fibre composite structures which do not make any significant contributions to the crash resistance. The outer shell guarantees the necessary stiffness of the construction in that it is realized as a multilayered fibre composite structure, optionally with cores lying between the fibre layers. Laid, twisted or braided fibre fabrics can be used in the fibre layers. To improve the stiffness, UD fibre strands (unidirectional fibre strands) are also possible. It is advantageous that the A pillars of the outer cab have no special reinforcements for the force transmission in the event of a crash. The A pillars of the outer cab are preferably designed for the feeding-through of electrical wires. The outer cab shell is preferably constructed from fibre non-crimp fabrics which are then impregnated with a matrix material and consolidated. The construction from fibre non-crimp fabrics pre-impregnated with matrix material is also possible. The outer shell is preferably connected to the inner shell in the area of the front and side windows. Here, the two shells are screwed, adhesively bonded or connected to each other in another way. The front window is preferably glued into the outer shell. Predetermined breaking points, which guarantee that the front window breaks away from the frame in the event of a crash and no or only a few fragments reach the interior, are preferably provided. In a further preferred embodiment, the front window has its own frame with which it is fixed in the outer shell. Predetermined breaking points are also preferred here.

The head module has a flat nose. Force components in the vertical direction, which cause overriding, are thereby effectively prevented. This approach is advantageous as only identical train units can come together. A crash box is arranged behind the part of the flat nose which protrudes furthest in the direction of movement (and when the central buffer coupling is not telescoped). This crash box is constructed according to known embodiments from the state of the art. The crash box preferably comprises a metal foam (preferably aluminium foam) which is arranged in a fibre composite housing. In the event of a crash, this metal foam is compressed under energy absorption.

The lower crash conduction element is curved in such a way that it runs in the area of the inner shell underneath the cab base and only rises in the interface area to the underframe support to the level thereof in order to make the installation possible. This is preferably effected with detachable metallic connections, preferably screw connections. In a particularly preferred embodiment, the crash conduction element is constructed double-angled. It runs from the crash box, which is arranged underneath the railing and above the central buffer coupling, diagonally downwards to underneath the base of the inner shell. There it changes direction into the horizontal to approximately the end of the base of the inner shell. Here it rises diagonally to the connection interface to the underframe support. The included angles between the horizontal and the angled sections of the crash conduction element preferably lie in the range between 15° and 75°, preferably between 30° and 60°. The crash conduction element preferably has a U-shaped cross section open towards the bottom (or right-angled cross section, open towards the bottom). This guarantees a particularly high stiffness even in the event of a crash. The central buffer coupling is arranged on the lower crash conduction element after the first curvature (after the section which leads from the crash box to the horizontal section of the lower crash conduction element). The central buffer coupling is preferably held via a metallic installation element which is fixed to the arms of the U-shaped cross section pointing downwards, preferably by means of a bolt or screw connection. For this, the crash conduction element has corresponding installation openings or screw holes. The central buffer coupling is fixed to the installation element.

Optionally, the crash conduction element has further installation openings or screw holes on the upper side, by means of which a connection to the inner cab shell can be produced.

The distance between the two arms of the U-shaped cross section is preferably constant over the length of the crash conduction element, seen in the direction of movement. However, in further preferred embodiments this distance can also increase or decrease. The length of the two arms of the U-shaped cross section can also vary over the length of the crash conduction element, seen in the direction of movement, in particular it can be shorter in the upward and downward sloping sections than in the horizontal section.

As the crash conduction element is preferably designed by means of computer-aided design and simulation tools, the actual embodiment is the result of a computer-aided optimization. Here, the distance between the arms or the length of the arms and the variation thereof are also determined by the component length.

The lower crash conduction element is preferably manufactured from fibre composite material. A multilayered arrangement of reinforcing fibres is advantageous here. Here, at least one unidirectional ply is provided which leads (in the main load direction) from the front end of the crash conduction element (from the crash box) to the rear end of the crash conduction element (the introduction and installation point on the underframe support of the following coach section). Optionally, several unidirectional plies are provided which can extend both in the curve or horizontal section of the curvature of the U shape and in the arms of the U-shaped cross section. The unidirectional plies (UD plies) advantageously alternate with reinforcing material plies, which are oriented multiaxially. In a particularly preferred embodiment, the plies are connected to one another. For this, interlocking, but particularly preferably fibre connections in the form of sewing or stitching together of the fibre plies are used.

In a further preferred embodiment of the crash conduction element, a three-dimensionally designed fibre-reinforcing material is used. Three-dimensional fibre reinforcements of this type can be produced e.g. by braiding using special machines from Herzog. The three-dimensionally designed fibre-reinforcing material can be used alone or in combination with further fibre plies. A three-dimensionally designed fibre-reinforcing material is particularly preferably shot through in the load direction with unidirectional fibres which further increase the fibre reinforcement in this direction.

In combination with the above-named solutions, randomly oriented (e.g. felt-like) fibre plies can also be used as reinforcing fibre material, in particular together, preferably alternating, with UD fibre plies.

In the area of the installation openings, or of the screw holes, alternative embodiments provide reinforcing inlays which are embedded in the matrix material together with the fibre-reinforcing material. These can be e.g. sleeves made of stainless steel or titanium.

A railing reinforcement of the inner cab shell is preferably arranged underneath the front window. In the outer shell, a plate made of fibre-reinforced (preferably carbon fibre-reinforced) plastic is optionally arranged underneath this railing reinforcement, or, if this is omitted, underneath the railing of the front window and above the central buffer coupling. This plate preferably reaches over the entire width of the front of the cab. Narrower designs are optionally possible. In the central part of the plate, the latter is thickened at the point which lies in front of the crash box. The plate, together with the crash box and the lower crash conduction element, then forms a safety system which diverts the forces still arising behind the crash box into the underframe support of the following coach. In the event of a collision the thickened part is broken out of the plate (in the process absorbs a portion of the energy) and the further movement is absorbed by the crash box which converts it into deformation energy.

Fibre composite materials are used as preferred materials for the cab shells and the systems for the event of a crash. Fixing elements etc. can advantageously be manufactured from metal. According to the state of the art the central buffer coupling is also made from metal. The fibre composite materials are preferably resins, preferably epoxy resins or phenolic resin systems, reinforced with carbon fibres, glass fibres or basalt fibres.

The construction of the cab and the design of the crash system according to the invention are preferably effected using computer-aided simulation processes, which allow the design to be carried out in accordance with the regulations in force. The simulation processes and computer-aided design tools are known to a person skilled in the art.

The following figures illustrate a preferred embodiment of the head module for a rail vehicle designed according to the invention.

Figure 1:
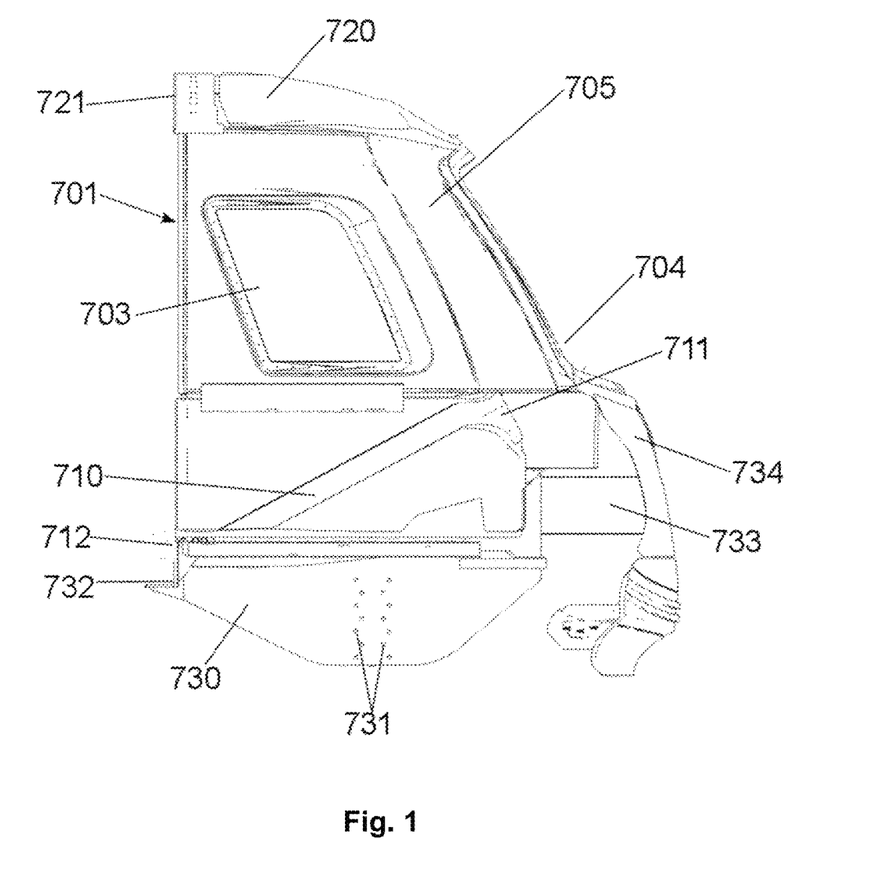

FIG. 1 shows a schematic side view of the cab according to the invention without the outer shell. The central buffer coupling has also been omitted for the sake of clarity. The inner shell 701 is designed in two parts. The division occurs in the horizontal plane above the railing reinforcement 711. The upper part of the inner shell 701 comprises the opening 704 for the front window and the side windows 703. The window openings are separated from each other by the A pillar 705. Above the upper part of the inner shell the ring beam 720 is represented. It is detachably fixed to the upper longitudinal beams of the following coach section (not represented) via the fixing device 721.

The railing reinforcement 711 and the UD braces 710 which transmit the force from the railing reinforcement 711 to the introduction points 712 into the lower longitudinal beams of the following coach section are integrated into the lower part of the inner shell.

The lower crash conduction element 730 runs underneath the lower part of the inner shell. On the front side of the cab the plate 734 is represented. In the area of the following crash box the plate has a thickness of 4 cm. In the surrounding area it is still approx. 2 cm thick. The plate is made from carbon fibre-reinforced plastic. The crash box 733 is arranged behind this plate. In the event of a crash, the collision takes place on the plate 734, which passes the force onto the crash box 733 and dissipates it as far as possible there. Remaining impact energy is passed on into the lower crash conduction element 730 and there is transferred at the fixing point 732 into the underframe support of the following coach section. In the horizontal section of the lower crash conduction element 730, the openings 731 for fixing the central buffer coupling are visible.

Figure 2:
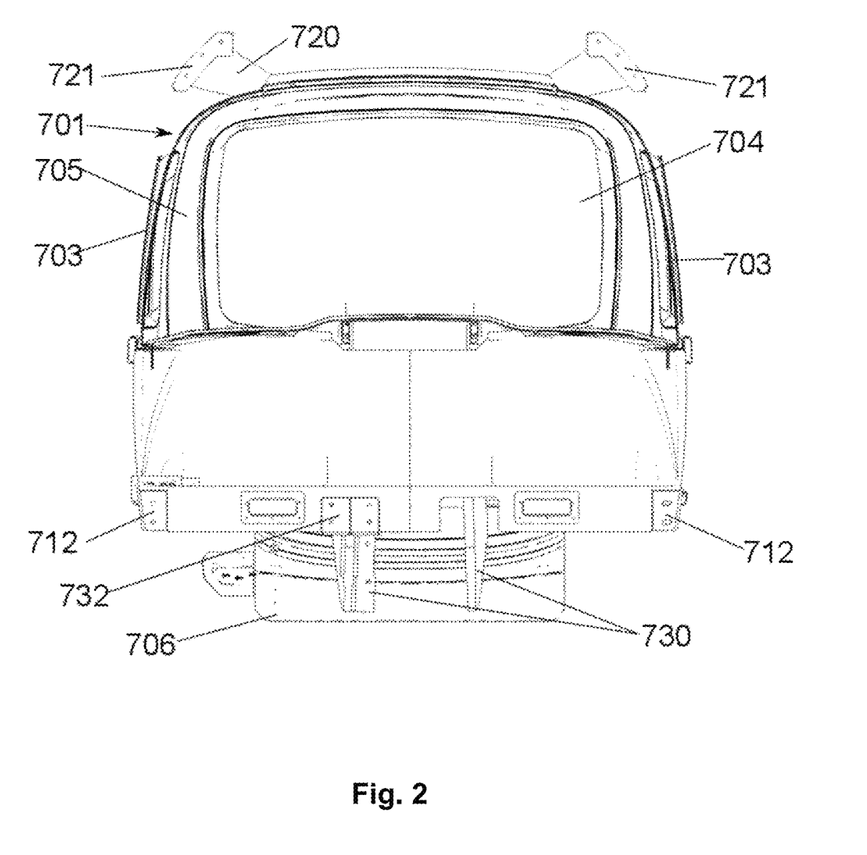

FIG. 2 shows the schematic rear view of the inner shell of the cab. This is the side with which the cab is installed on the following coach section. The installation is preferably effected on the two upper longitudinal beams of the following coach section by means of the fixing elements 721 of the upper ring beam, by means of the fixing elements at the introduction points 712 of the UD braces from the railing reinforcement and by means of the fixing device 712 (only one is represented, a second is arranged symmetrically on the right-hand side) of the lower crash element on the underframe support.

Figure 3:
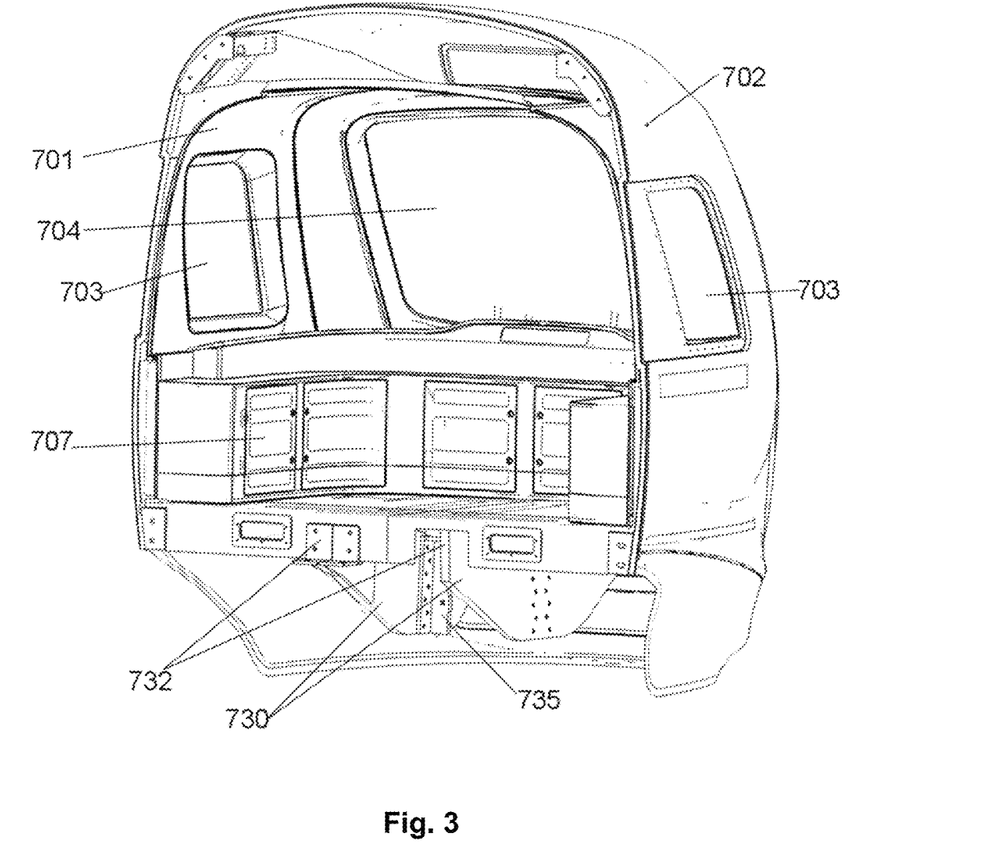

FIG. 3 shows, schematically, how the inner shell 701 is fitted into the outer shell and, by way of example, how the internal fittings 707 can be arranged.

Figure 4:
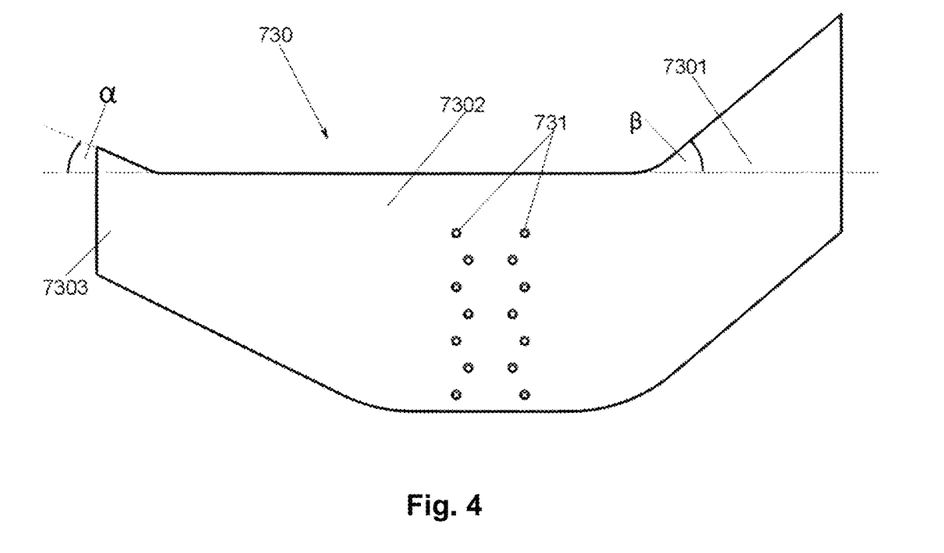

FIG. 4 shows a schematic side view of the crash conduction element 730. The crash conduction element 730 has a downward sloping area 7301 in which it runs from the crash box (not represented) to the horizontal section 7302. With the upward sloping section 7303 the crash conduction element runs from the horizontal section to the connection point to the central buffer coupling (not represented).

Figure 5:
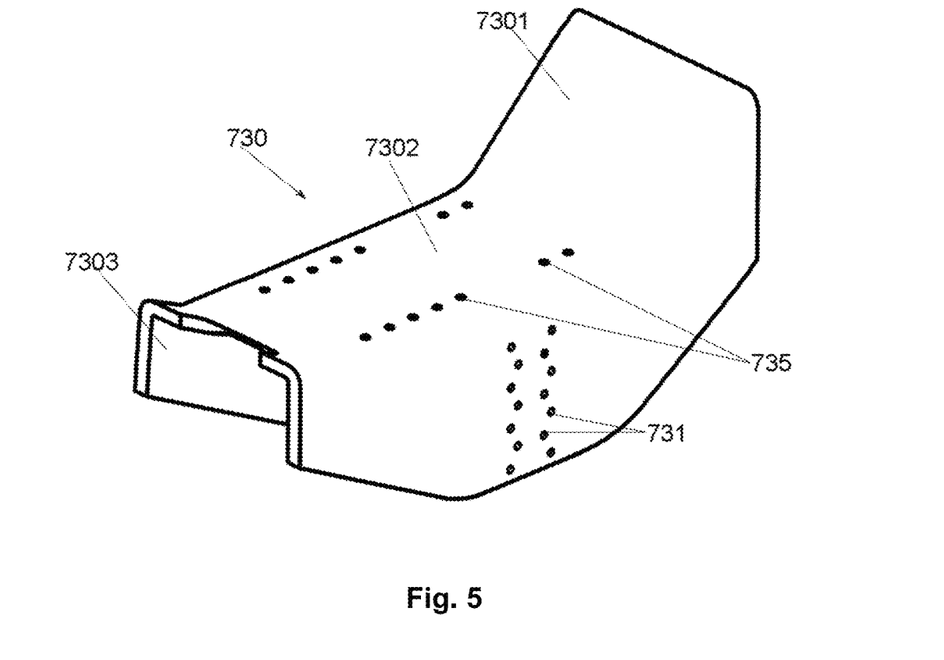

FIG. 5 shows a schematic 3D view of the crash conduction element 730 from FIG. 4.

Figure 6:
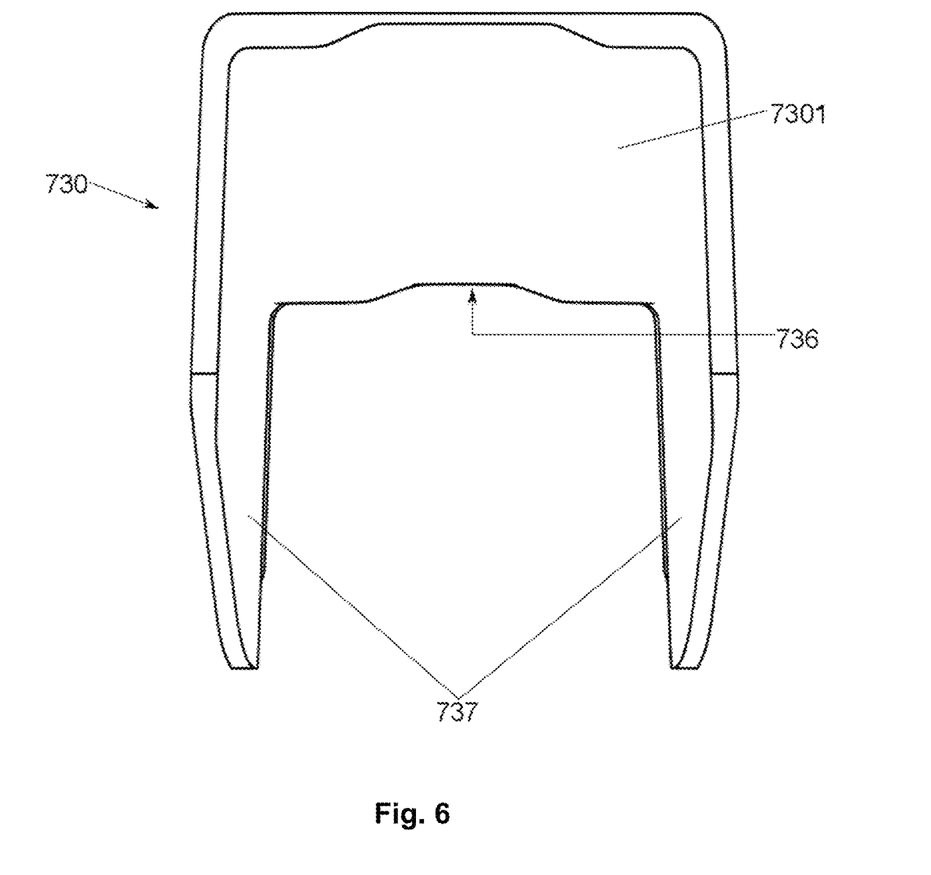

FIG. 6 shows the schematic front view of the crash conduction element 730. For illustration the U-shaped cross section of the crash conduction element 730, with the curved area 736 and the two arms 737, is represented.

Figure 7:
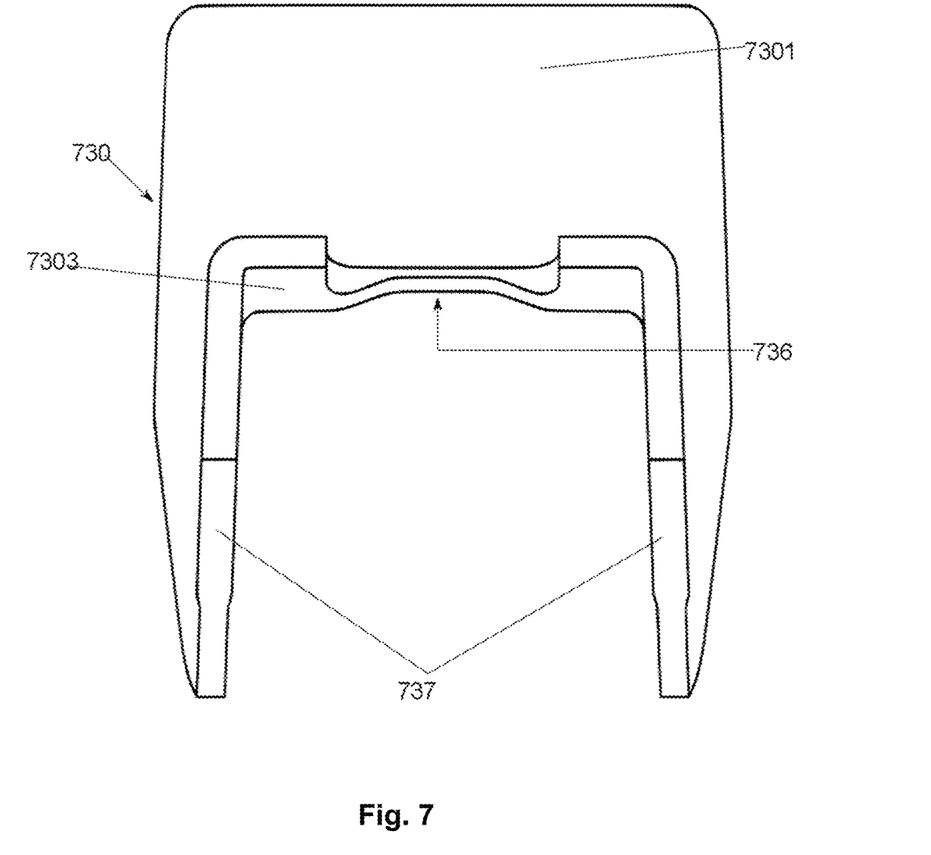

FIG. 7 shows the schematic rear view of the crash conduction element 730. In this representation, it can be seen particularly clearly that the crash conduction element has a shape in which the distance between the two arms decreases from the crash box (not represented) towards the back of the crash conduction element 730.

LIST OF REFERENCE NUMBERS

701 inner shell
702 outer shell
703 side window opening
704 front window opening
705 A pillar
706 cover flap of the central buffer coupling
707 internal fittings
730 lower crash conduction element
7301 section of the crash conduction element from the crash box to the horizontal section
7302 horizontal section
7303 section of the crash conduction element from the horizontal section to the fixing element on the underframe support
731 holes for fixing the central buffer coupling
732 fixing device of the lower crash element on the underframe support
733 crash box
734 plate
735 installation bar for central buffer coupling
736 curved area of the U-shaped cross section
737 arms of the U-shaped cross section
$\alpha$ angle of the section of the crash conduction element from the horizontal section to the fixing element on the underframe support
$\beta$ angle of the section of the crash conduction element from the crash box to the horizontal section

What is claimed is:

1. A crash system for the head module of a rail vehicle, wherein the head module is suitable to be detachably fixed to the end face of a coach section, and wherein the end face of the coach section has the installation interfaces:
    two longitudinal beams of the underframe, which extend in the longitudinal direction on the lower edges of the coach section and the end faces of which are suitable for the installation of the vehicle head,
    an underframe support, which runs between the two longitudinal beams of the underframe and opens into the main cross beam which is mounted in the bogie of the coach section, wherein the end face of the underframe support is suitable for the installation of the vehicle head,
    two longitudinal beams of the coach roof, which extend in the longitudinal direction on the upper edges of the coach section and the end faces of which are suitable for the installation of the vehicle head,
    and the head module is constructed from an inner and an outer shell and has at least one crash system which is suitable for converting kinetic energy into deformation in the event of a crash, wherein this crash system includes:
    a crash box which is arranged underneath the front window and above the central buffer coupling,
    a lower crash conduction element which carries the crash box at its front end and with its rear end is fixed to the underframe support of the coach section and transmits forces arising in the event of a crash into the underframe of the coach section,
    a central buffer coupling which is arranged on the crash conduction element such that the tensile or compressive forces of normal operation are transmitted from the central buffer coupling via the crash conduction element into the underframe of the coach section,
    wherein the lower crash conduction element has a U-shaped cross section open towards the bottom.

2. The crash system according to claim 1, wherein the lower crash conduction element runs from the crash box in a downward sloping manner in the direction of a horizontal section running underneath the cab base and after the horizontal section in an upward sloping manner to the fixing device of the lower crash element on the underframe support.

3. The crash system according to claim 2, wherein the lower crash conduction element is made from fibre composite material, in particular carbon fibre composite material.

4. The crash system according to claim 3, wherein the lower crash conduction element is composed of several fibre plies with fibres of varying orientation.

5. The crash system according to claim 4, wherein at least one fibre ply has UD fibres which extend over the entire length of the crash conduction element.

6. The crash system according to claim 2, wherein in front of the crash box of the lower crash conduction element in the direction of movement of the head module, a plate made of carbon fibre composite material is arranged which absorbs a portion of the impact energy in the event of a crash.

7. The crash system according to claim 1, wherein the distance between the arms of the U-shaped cross section of the lower crash conduction element increases or decreases over the length of the crash conduction element.

8. The crash system according to claim 7, wherein the length of two arms of the U-shaped cross section varies over the length of the crash conduction element, seen in the direction of movement.

9. The crash system according to claim 8, wherein the length of the two arms of the U-shaped cross section is shorter in the upward and downward sloping sections than in the horizontal section.

10. The crash system according to claim 1, wherein the length of two arms of the U-shaped cross section varies over the length of the crash conduction element, seen in the direction of movement.

11. The crash system according to claim 10, wherein the length of the two arms of the U-shaped cross section is shorter in the upward and downward sloping sections than in the horizontal section.

12. The crash system according to claim 1, wherein the lower crash conduction element is made from fibre composite material, in particular carbon fibre composite material.

13. The crash system according to claim 12, wherein the lower crash conduction element is composed of several fibre plies with fibres of varying orientation.

14. The crash system according to claim 13, wherein at least one fibre ply has UD fibres which extend over the entire length of the crash conduction element.

15. The crash system according to claim 13, wherein different fibre plies are interlocked, sewn or stitched together.

16. The crash system according to claim 12, wherein different fibre plies are interlocked, sewn or stitched together.

17. The crash system according to claim 1, wherein in front of the crash box of the lower crash conduction element in the direction of movement of the head module, a plate made of carbon fibre composite material is arranged which absorbs a portion of the impact energy in the event of a crash.

18. The crash system according to claim 17, wherein the plate is designed thickened in the part which is connected to the crash box.

* * * * *